United States Patent [19]

Carroll et al.

[11] Patent Number: 5,035,582
[45] Date of Patent: Jul. 30, 1991

[54] ELECTRO-PNEUMATIC GOVERNOR FOR A COMPRESSED AIR-SYSTEM

[75] Inventors: John B. Carroll, Irwin, Pa.; Michael V. Hatzikazakis, Greer, S.C.

[73] Assignee: American Standard Inc., Spartanburg, S.C.

[21] Appl. No.: 468,454

[22] Filed: Jan. 22, 1990

[51] Int. Cl.$^5$ ............................................. F04B 49/06
[52] U.S. Cl. ........................................ 417/44; 417/18
[58] Field of Search .................. 417/44, 46; 137/487.5

[56] References Cited

U.S. PATENT DOCUMENTS

| | | | |
|---|---|---|---|
| 2,159,781 | 5/1939 | Craig | 172/179 |
| 2,986,617 | 5/1961 | Shirey | 200/82 |
| 3,089,008 | 5/1963 | Shirey | 200/82 |
| 3,143,969 | 8/1964 | Eames et al. | 417/44 |
| 3,502,029 | 3/1970 | Halladay | 417/44 X |
| 3,888,603 | 6/1975 | Nagase | 417/25 |
| 4,026,321 | 5/1977 | Kahoe et al. | 137/487.5 X |
| 4,665,938 | 5/1987 | Brown et al. | 137/487.5 X |

Primary Examiner—Stephen M. Hepperle
Attorney, Agent, or Firm—J. B. Sotak

[57] ABSTRACT

A fluid governor including an electric motor for driving a fluid compressor and causing a build-up of pressure in a storage reservoir, pressure switch responsive to the pressure in the storage reservoir, electromagnetic solenoid valve connected to the pressure switch, a pneumatically operated electrical contact controller pneumatically connected to the magnetic solenoid valve for causing the pneumatically operated electrical contact controller to be connected to the storage reservoir when the pressure in the storage reservoir exceeds a first predetermined value to deenergize the electric motor and for causing the pneumatically operated electrical contact controller to be connected to atmosphere when the pressure in the storage reservoir drops to a second predetermined value to energize the electric motor.

22 Claims, 3 Drawing Sheets

ELECTRO-PNEUMATIC GOVERNOR FOR A COMPRESSED AIR-SYSTEM

FIELD OF THE INVENTION

This invention relates to an electro-pneumatic governor for a compressed air system which supplies pressurized air to the braking equipment of a railway vehicle and more particularly to a compressor governor apparatus for supplying fluid under pressure to the brakes of a vehicle employing a pressure switch for sensing the pressure level in a storage reservoir and for energizing and deenergizing a solenoid valve which closes a pneumatic operated switch contact controller for deenergizing an electric motor when the pressure level rises above a first predetermined value and for energizing the electric motor when the pressure level drops to a second predetermined value.

BACKGROUND OF THE INVENTION

It is common to equip vehicles with a motor-driven fluid compressor having a governor device in which the motor is stopped and started by a fluid pressure operated electric power control switch device which is responsive to the fluid pressure in the main or storage reservoir. In practice, the fluid pressure operated control switch includes a pressure operated piston to cause the electric switch contact members to move to an open position to thereby deenergize the motor and stop the compressor.

When the fluid pressure in the reservoir is reduced to a predetermined level, the usual high pressure valve of the governor is seated and the fluid pressure in the piston chamber is vented to atmosphere. The switch operating piston is spring biased to restore the switch contact members to their closed position, thereby starting the compressor motor and continuing operation of the compressor until the fluid pressure has built up in the reservoir, at which time the governor operates in a well-known manner to supply fluid under pressure to the aforementioned piston chamber to act on the one side of the piston to cause the switch contact members to move to their open position as above mentioned.

In the past, the air governor portion included a pair of reciprocating spool valves having metal-to-metal valve seats which are prone to leakage and seizure. It has been found with such governors that dirt and other foreign material in the high pressure valve chamber causes improper opening of the high pressure valve such that the fluid pressure is delivered to the piston chamber of the control switch at a dramatically reduced rate to cause slow opening of the contact members thereof. Another possible adverse effect of dirt and debris present in the high pressure valve is the improper seating of the high pressure valve, resulting in leakage of fluid under pressure past the valve and seat to the piston chamber of the control switch to cause a slow undesired fluid pressure build-up which in turn causes a slow undesired opening of the electrical switch contact members. The slow movement of the control piston caused by the improper seating or opening of the high pressure valve of the governor correspondingly results in slow opening of the electrical switch contact members, causing excessive arcing and burning of the main contacts to cause failure and to thereby result in the inability to complete the compressor motor supply circuitry when fluid pressure in the reservoir is low.

Recently, there has been a rash of such problems which has resulted in the need to structurally redesign the governor portion to improve the functional operation of the electrical switch contact controller to effectively energize and deenergize the electric drive motor.

OBJECTS AND SUMMARY OF THE INVENTION

Accordingly, it is an object of the invention to provide a new and improved electro-pneumatic governor for a motor-driven air compressor system.

Another object of the invention is to provide a unique governor employing an electrical pressure switch and a solenoid valve for controlling an electro-pneumatic switch device which deenergizes an electric motor used for driving an air compressor.

A further object of this invention is to provide a novel air compressor governor including a pneumatically operated electrical switch and a three-way solenoid switch for causing the electrical cut-out or deenergization of a drive motor by a pneumatically operated switch device to stop the compression operation of the air compressor.

Still another object of this invention is to provide an improved electro-pneumatic governor using a pressure sensing electrical switch for controlling the electrical condition of a solenoid valve which pneumatically disconnects a electro-pneumatic operated switch device from a storage reservoir when the pressure reaches a predetermined level and causes the electro-pneumatic operated switch device to deenergize an electric motor which stops an air compressor.

Still a further object of this invention is to provide a governor for limiting the pressure in a storage reservoir by stopping a motor-driven compressor when the pressure actuates a pressure-responsive snap-action switch to deenergize a solenoid valve to cause the opening of a motor switch controller to deenergize the motor.

Yet another object of this invention is to provide a fluid compressor governor comprising a pressure-responsive switch, a three-way solenoid valve, and an electro-pneumatic circuit switch contact controller for energizing and deenergizing an electric drive motor in accordance with the pressure level in a storage reservoir.

Yet a further object of this invention is to provide an electro-pneumatic governor portion consisting of a pressure switch and a solenoid valve mounted on a base which communicates by means of two ports with the manifold of the compressor governor with a given geometry between the two ports.

An additional object of this invention is to provide a unique electro-pneumatic governor for a motor-driven air compressor which is economical in cost, effective in operation, reliable in use, durable in service, simple in construction, and easy to install and maintain.

In accordance with the present invention, there is provided an electro-pneumatic governor for a compressed air system comprising an electric motor for driving an air compressor to cause pressure build-up in a storage reservoir, a pressure switch for sensing the pressure level in the storage reservoir, a solenoid valve electrically connected to the pressure switch, a pneumatic operated switch contact controller electrically connected to said electric motor, the pressure switch causing the solenoid valve to establish communication between the storage reservoir and the pneumatic operated switch contact controller when the pressure level in the storage reservoir reaches a first predetermined value, the pneumatic operated switch contact controller deenergizes the electric motor and the pressure switch causes the solenoid valve to interrupt the communication between said storage reservoir and the pneumatic operated switch contact controller when the pressure level falls below a second predetermined level so that the pneumatic operated switch contact controller reenergizes the electric motor when the pressure level drops to the second predetermined value.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
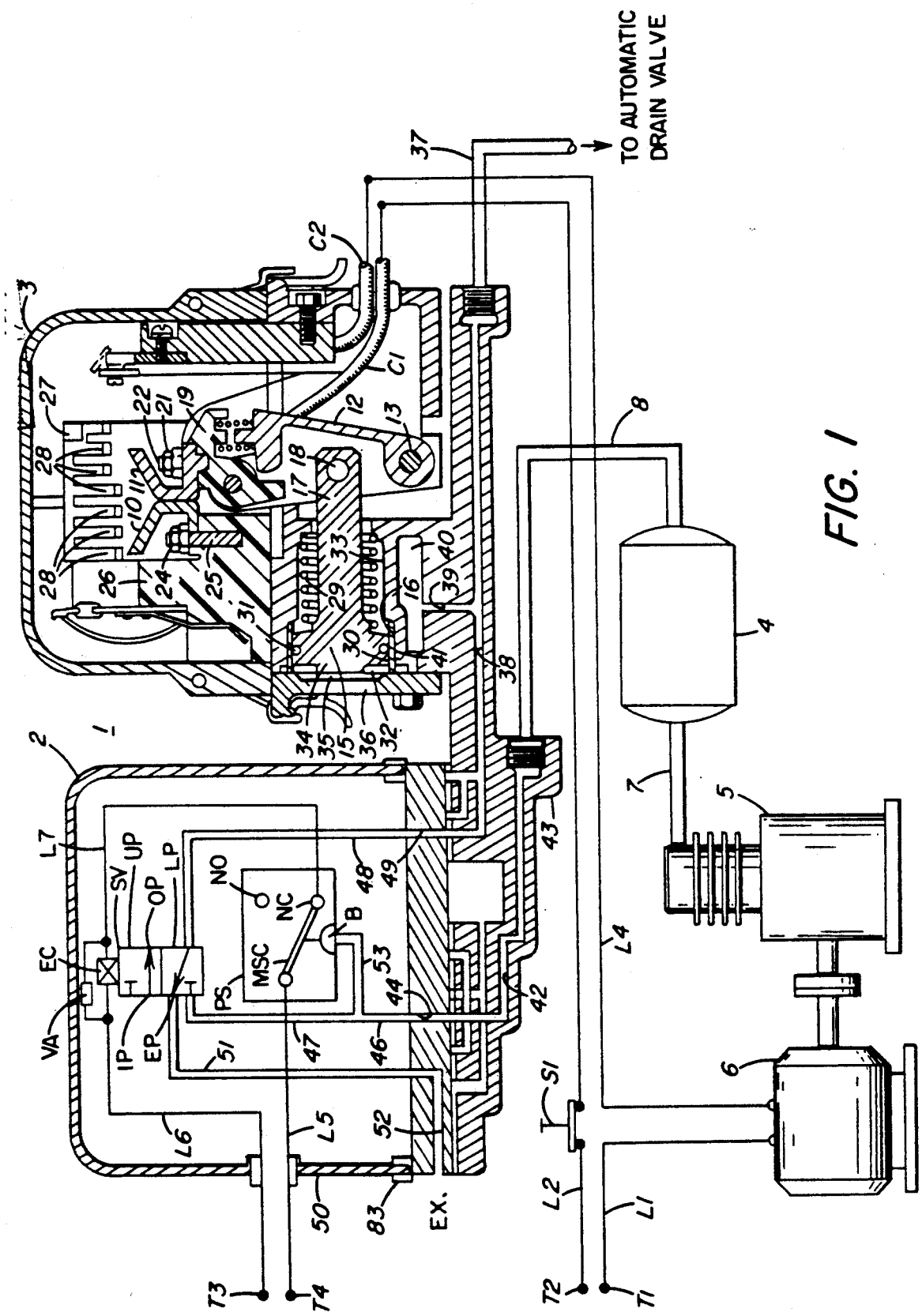
FIG. 1 is a diagrammatic view, both in outline and in section, of a governor for a fluid pressure control system including an enlarged schematic view of the electro-pneumatic pressure switch and electric solenoid valve portion and an enlarged sectional view of the motor control switch device embodying the present invention.

Referring now to the drawings, and in particular to FIG. 1, there is shown an electro-pneumatic governor for a fluid pressure supply system having an electro-pneumatic pressure switch and electric solenoid valve portion 2 and switch contact controller portion 3, generally characterized by numeral 1 for controlling and regulating the pressure supplied to a storage or main reservoir by a motor-driven air compressor 5, driven by an electric motor 6. That is, the air compressor 5 is coupled to and driven by a direct current electric motor 6 for charging the storage reservoir via a pipe or conduit 7. The reservoir 4 is connected to the governor 1 via pipe or conduit 8. The switch and solenoid device 2 is pneumatically interconnected to the switch contact controller device 3, as will be described hereinafter. As shown, the electric motor 6 is electrically connected to terminals T1 and T2 of a suitable source of direct current voltage (not shown). For example, terminal T1 is connected to motor 6 via lead L1 while terminal T2 is connected via lead L2 to one end of a manually operable switch S1 which closes or opens the motor circuit when the system is to be in service or taken out of service, respectively. The other end of switch S1 is connected to a stationary switch contact 10 of controller device 3 via lead L3 and conductor C1. It will be seen that the movable switch contact 11 of controller device 3 is connected to the motor 6 via conductor C2 and lead L4.

As shown, the switch contact controller 3 consists of the conventional components or elements, such as a latch protective cover 9 for housing the stationary switch contact 10 and the movable switch contact 11 which is mounted on the remote end of a pivotal contact lever 12. The lever 12 is pivotally mounted on a fulcrum pin 13 which is suitably secured to the body 14 of the switch device 3. An operating piston 15 is movable between two extreme positions within a bore 16 in response to a supply of fluid under pressure. As shown, the piston rod or stem 17 is pivotally connected to the contact lever 12 by fulcrum pin 18 to cause the switch contacts 10 and 11 to be opened and closed when the piston 15 is moved to one or the other extreme position.

It will be appreciated that both of the switch contacts 10 and 11 are replaceable so that they can be renewed when badly burned or pitted by arcing therebetween. The movable switch contact element 11 is secured to pivotal contact rocker 19 of insulating material by lock nuts 21 and an electrical terminal stud 22 molded in the insulative body 19. The movable switch contact 11 is urged toward the stationary switch contact 10 by a biasing spring 23 which ensures good and solid engagement between the two switch contacts 10 and 11 when the contacts are closed. The stationary switch contact 10 is securely fastened by lock nuts 24 to a threaded terminal stud 25 which is molded in an insulating block 26. Preferably, the insulating block 26 is of a mold glass-filled polyester or similar insulative material and is secured to the switch body 14 by suitable bolts (not shown) in such a manner to electrically insulate the switch contact 10 from the metal body 14. As shown in FIG. 1, a flame-resistant insulative U-shaped arc chute 27 surrounds the switch contacts 10 and 11. The arc chute 27 includes appropriate arc diffusers or arc choppers 28 interposed between respective sides of the chute to assist in suppressing or breaking up any arc or spark that occurs between the switch contacts 10 and 11.

It will be seen that the switch operating piston 15 is located in the lower section of the switch contact controller portion 3 in the cylindrical bore 16 in which a replaceable sleeve or liner 30 is situated. A rubber O-ring 31 is situated in an annular groove formed in the piston 15 to maintain a tight fluid seal on the inner wall of the cylindrical liner 30 which is coaxial and slightly smaller than the diameter of the bore 16. It will be noted that the piston 15 is slidably positioned within the sleeve 30 and bore 16 in such a manner to form a piston chamber 32 on the left side of the face of piston 15 as shown in FIG. 1. The right side of the piston 15 has the stem 17 extending into a cylindrical bore 33 to form a spring chamber for housing a piston return spring 29.

Figure 2:
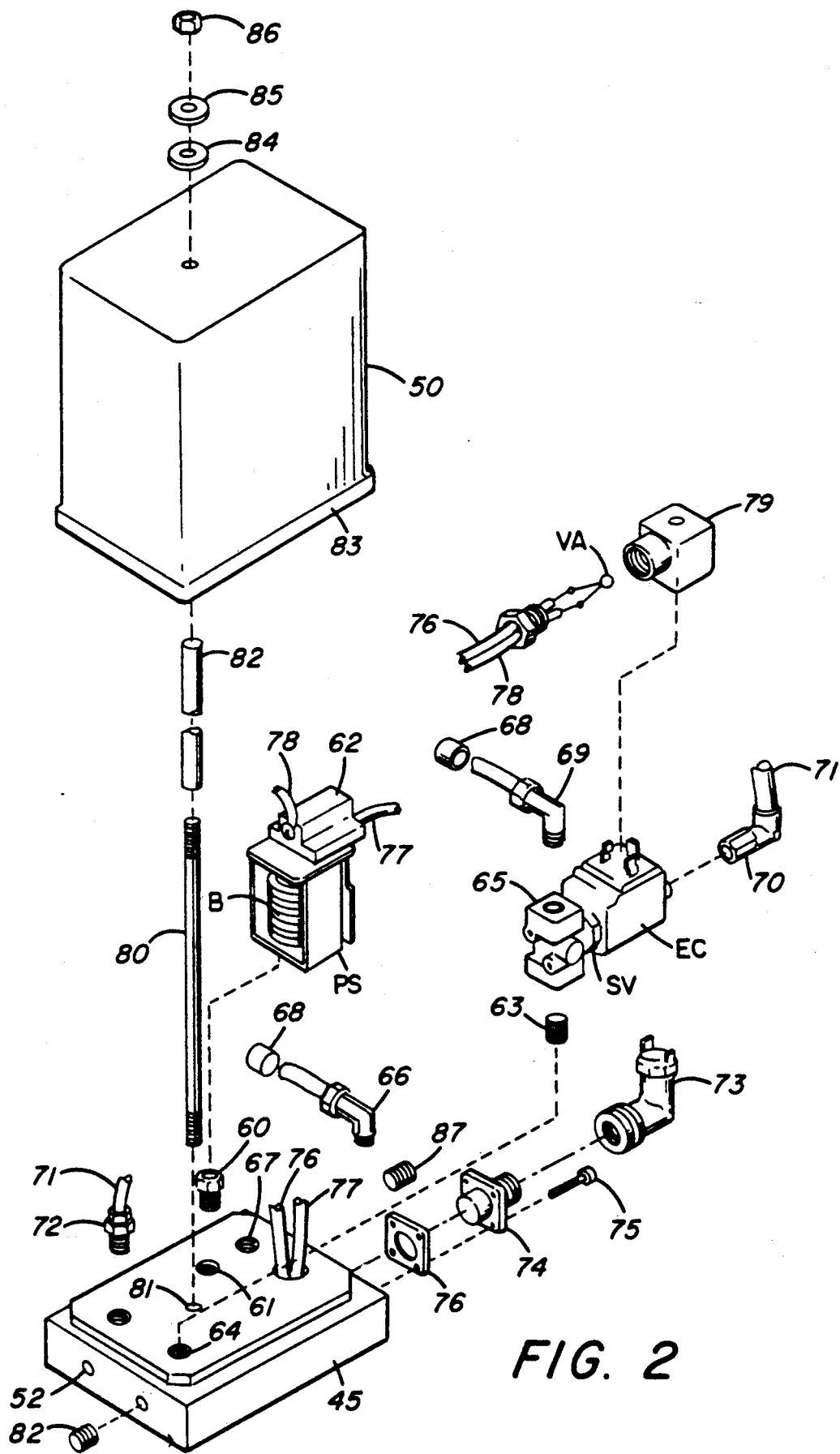
FIG. 2 is an exploded view illustrating in disassembled relationship the various components of the electro-pneumatic pressure switch and electric solenoid valve portion employed in the present invention.
Figure 3:
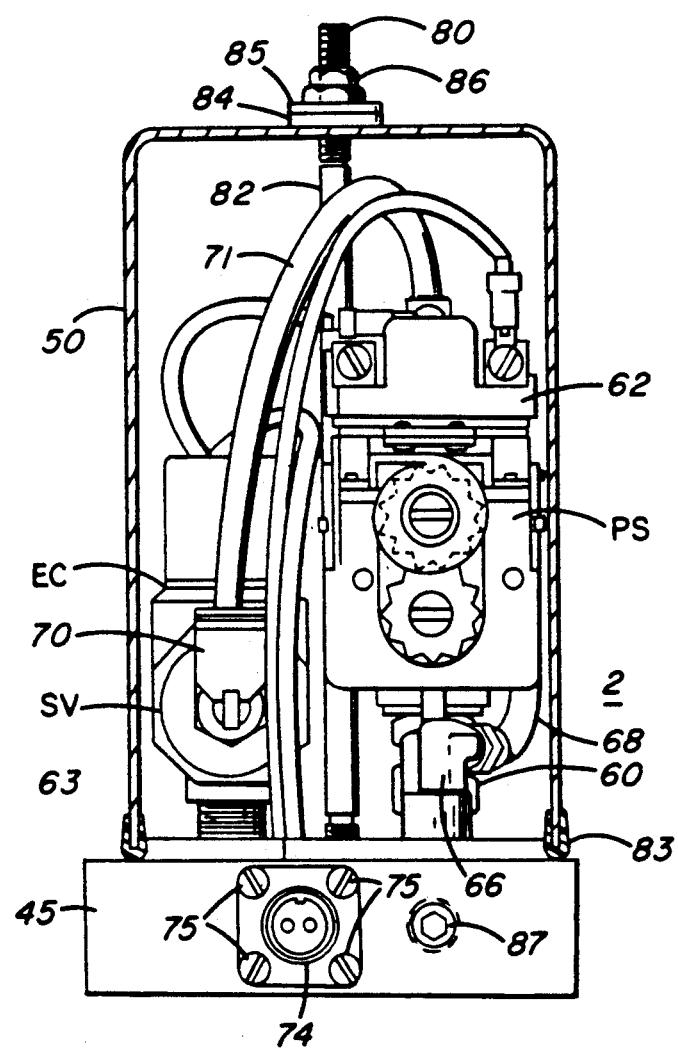
FIG. 3 is an end elevational view of the assembled electro-pneumatic pressure switch and electric solenoid valve portion of the present invention.

As shown in FIGS. 1, 2, and 3, the pressure switch and solenoid valve device 2 includes the three-way solenoid valve SV as well as an electro-pneumatic pressure switch PS which are housed and mounted inside the protective cover or enclosure 50 of the governor 2. The pressure switch PS may be of the type shown and described in Bulletin 836 by Allen Bradley. In viewing FIG. 1, it will be noted that the electromagnetic solenoid valve SV includes the lower valve portion LP having an exhaust port EP and an upper valve portion UP having an input port IP and an output port OP. The solenoid valve SV is a three-way configuration and includes an electromagnetic coil EC which is connected in parallel with a two-terminal resistive element, such as, a varistor VA which subdues and suppresses voltage transients or surges. When the solenoid coil EC is energized, the valve SV assumes its lower position LP in which the pipe 48 is connected to atmosphere via pipe 51 and passage 52, and when the solenoid is deenergized, a biasing spring urges the valve SV to the upper position UP in which the pipe 47 is connected to pipe 48. At this lower position, the pipe 47 is blocked off so that the pressure in the reservoir 4 is maintained at its given level. It will be noted that the pressure switch PS includes a flexible chamber, such as bellows B, or other suitable pressure expansion and contraction device, which is connected by pipe 53 to pipes 46 and 47. Thus, the bellows B senses the pressure level in the main reservoir 4 to operate a movable switch contact MSC which is connected between an operating rod R and the bellows B. The pressure switch PS also includes a normally closed stationary contact NC and a normally opened stationary contact NO. It will be seen that the electric coil EC of the solenoid valve SV and the movable contact MSC of the pressure switch PS are connected to terminals T3 and T4 of a suitable source of direct current voltage such as, a 38 VDC. As shown, the movable contact MSC is connected to voltage terminal T4 via lead L5 while the one end of the solenoid coil SC and varistor VA is connected to voltage terminal T3 via lead L6. The other end of the solenoid coil SC and varistor VA is shown connected to the normally closed stationary contact NC via lead L7. It will be appreciated that, when the pressure in the reservoir 4 which in turn is conveyed to bellows B is below a predetermined value, the movable contact MSC engages contact NC which causes the closing of the circuit to the solenoid coil EC from the voltage source across terminals T3 and T4 and thus energizes the electromagnetic valve SV. Thus, the lower portion LP of the solenoid valve SV establishes a fluid communication path from the main reservoir 4 to the chamber 32 of the switch contact controller device 3. Normally, the contacts 10 and 11 are closed when the pressure is below a preselected value.

It will be understood that prior to start-up and at the time of initial start-up, the reservoir 4 is not charged with fluid under pressure so that the bellows B is substantially void of fluid under pressure since there is little if any fluid flowing through pipe 8, passages 42 and 44, and pipe 53. Thus, the bellows B is contracted and the movable contact MSC engages stationary contact NC so that the electromagnetic coil EV is energized. Thus, the solenoid valve SV assumes the position as shown in FIG. 1. Under this condition, the lower portion LP shuts off the pipe 47, and vents the chamber 32 to atmosphere via passage 41, chamber 40, passages 39, 38, 46, lower portion LP, pipe 51, and passage 52. Accordingly, the operating piston 15 is initially in the extreme left-hand position in which the stop disc 34 on the piston 15 is in intimate engagement with the stop disc 35 internally formed on the chamber cover 30. Thus, with little or no pressure in chamber 32, the force of the return spring 29 causes the piston 15 to assume its left-hand position as shown in FIG. 1. Thus, the piston rod 17 causes the contact lever 12 to be pivoted about pin 13 so that the switch contacts are closed in which movable switch contact 11 is in intimate electrical contact with the stationary switch contact 10. It will be seen that the fluid pressure is conveyed to the from the main reservoir 4, via pipe or conduit 8, passage 42 formed in manifold 43, passage 44 formed in mounting plate or base member 45, pipes 46 and 53 to the bellows B of the pressure switch PS to the low portion LP of the electromagnetic or solenoid valve SV, via pipe 47 which is closed off. It will be noted the passage 38 of the switch controller device 3 is connected to an automatic drain valve via pipe 37 to empty moisture from the pneumatic device as necessary.

In order to initially start the compressor 5, the electrical switch S1 is closed to complete an electrical circuit path from the d.c. voltage source appearing across electrical terminals T1 and T2 through the closed switch contacts 10 and 11 to the electric motor 6. Since there is little or no pressure in the storage reservoir 4, the bellows B of the pressure switch PS is contracted and allows the rod to move downwardly. This allows the movable contact MSC to also move downwardly to electrically engage the stationary contact NC. Thus, the electromagnetic solenoid coil E.C. is energized and the lower portion LP of valve SV pneumatically interconnects the pipe 48 to pipe 51 thereby being vented to atmosphere via passage 52. The energized electric motor 6 drives the compressor 5 which begins to charge the reservoir 4 and starts to pressurize the pneumatic system. The compressor 5 begins to build up the pressure in the storage reservoir 4 via pipe 7 and conveys it to the electropneumatic switrch and solenoid 2 via pipe 8. Under this condition, the piston chamber 32 is initially void of fluid under pressure, and therefore the operating piston 15 is in the extreme left-hand position as shown, and as noted above, the contact elements 10 and 11 are closed.

Since there is initially no pressure in the bellows B, the movable switch contact MSC engages the stationary contact NC so that the magnetic coil EC of the solenoid valve SV is energized. The motor-driven compressor 5 builds up the pressure in the reservoir 4 which is conveyed to the flexible bellows B via pipe 8, passages 42 and 44 and pipes 46, 47, and 53. It will be appreciated that the pressure continues to build up and approaches 150 pounds per square inch (psi) so that the bellows B continues to expand upwardly. When the pressure in the bellows B reaches 150 psi, the push rod R opens the normally closed contact NC which deenergizes the electromagnetic coil EC of the solenoid valve SV. With the solenoid valve SV deenergized, the return spring RS shifts the valve to its upper position UP which connects the 150 psi pressurized pipe 47 to the chamber 32 of the switch controller 3 via pipe 50, passage 49, 38 and 39, chamber 40 and passage 41. The sudden surge of fluid pressure quickly builds up in chamber 32 to overcome the biasing force of return spring 29, causing the piston 15 to rapidly move to its right-hand position in the bore 16. The movement of the piston 15 to the right causes the stem 17 to rapidly rotate the pivotal lever 12 in a clockwise direction about pin 13 to open the main contacts 10 and 11 in a very quick motion to minimize the arcing therebetween. When the main contacts are opened, the electrical circuit energizing the electric drive motor 6 is quickly interrupted, thereby stopping operation of the compressor 5.

With the compressor 5 shut down, the pressure in the reservoir 4 and in the bellows B begins to be reduced through usage or leakage. In practice, when the fluid pressure drops to a predetermined level, such as a 130 psi, the bellows contracts sufficiently to again close the normally closed contact NC to reenergize the electromagnetic coil EC of the solenoid valve SV. Thus, the energized solenoid valve SV quickly shifts to its lower position LP to block off pipe 47 and to cause the chamber 32 to be quickly vented to atmosphere via pipe 51 and passage 52. The venting of chamber 32 causes the spring 29 to rapidly move the piston 15 to the left, which results in the closing of the main contacts 10 and 11 and causes the reenergization of the electric motor 6.

The motor cut-off and pressurization cycle is repeated as the pressure level builds up to 150 psi and the motor turn-on and depressurization cycle is reiterated when the pressure level drops to 130 psi.

Turning now to FIGS. 2 and 3, there is shown the pressure switch and solenoid valve portion 2 which forms part of electro-pneumatic governor 1 of FIG. 1. As shown, all of the components or elements of the device 2 are supported and carried by the mounting plate 45 which is suitably secured or bolted to the pipe bracket or manifold 43 of the governor 1. A mounting adapter 60 is screwed into a threaded hole or port 61 formed in the mounting plate 45. The pressure switch PS having bellows portion B and electrical contact portion 62 is connected to threaded adapter 60. A threaded nipple 63 is screwed into threaded hole or port 64 formed in the mounting plate 45, and the three-way solenoid valve SV having the electromagnetic coil EC and the pneumatic three-way valve portion 65 which is screwed into nipple 63. As shown, a 90° pipe elbow 66 is screwed into threaded hole or port 67 formed in the mounting plate 45 and is connected by flexible tubing 68 to a 90° pipe elbow 69 which is screwed into the three-way valve 65. Thus, the ports 61 and 64 have a given fixed geometric configuration for providing fluid communication with the appropriate passages in the manifold 43, namely, with passages 42 and 38. A PUSH TO CONNECT connector 70 is pneumatically connected by flexible tubing 71 to the threaded connector 72 which is screwed into threaded hole 73 formed into the mounting plate 45. It will be seen that the electrical connections are conveyed to the device 2 via a plug connector 73 which is screwed to the threaded receptacle box 74, is fastened to the mounting plate by screws 75 and is sealed against moisture by gasket 76. The receptacle 74 is connected to leads 76 and 77. Lead 76 is connected to one end of the varistor VA which has the other end connected to the normally closed contact via lead 78. The movable contact of the pressure switch PS is connected to lead 77 and the electromagnetic coil EC is connected in parallel with the varistor by a DIN (deutsche Industrie Normen, i.e., the German Industrial Standards) connector assembly. It will be seen that a threaded stud 80 is screwed into a threaded hole 81 formed in the mounting plate 45. An insulative sleeve 82 is slipped over the stud 80 and the free end of the threaded stud 80 guided through a hole formed in the top of cover or enclosure 50. A rubber seal 83 having a U-shaped cross-section is fitted about the bottom peripheral of the enclosure 50 for preventing the entrance of moisture and dirt. As shown, a rubber washer 84 is initially placed on the end of stud 80 and next a plated flat washer 85 is disposed thereon. Next, an elastic stop nut 86 is threaded and tightened onto the stud to hold the enclosure in place. Thus, it is seen that the ihternal components are effectively protected against the environment and no special mounting brackets or the like are needed to support the componets.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiments of the invention may be made by those skilled in the art without departing from the spirit and scope of the invention as set forth in the appended claims.

We claim:

1. An electro-pneumatic governor for a compressed air system comprising, an electric motor for driving an air compressor to cause pressure build-up in a storage reservoir, a pressure switch for sensing the pressure level in said storage reservoir, a solenoid valve electrically connected to said pressure switch, a pneumatically operated switch contact controller electrically connected to said electric motor, said pressure switch causing said solenoid valve to establish communication between said storage reservoir and said pneumatic operated switch contact controller when the pressure level in said storage reservoir reaches a first predetermined value so that said pneumatic operated switch contact controller deenergizes said electric motor, and said pressure switch causes said solenoid valve to interrupt the communication between said storage reservoir and said pneumatically operated switch contact controller when the pressure level falls below a second predetermined level so that said pneumatically operated switch contact controller reenergizes said electric motor when the pressure level in said storage reservoir drops to a second predetermined value.

2. The electro-pneumatic governor for a compressed air system as defined in claim 1, wherein said solenoid valve includes an electromagnetic coil and a three-way pneumatic device.

3. The electro-pneumatic governor for a compressed air system as defined in claim 1, wherein said pressure switch includes a bellows for opening and closing electrical contacts in accordance with the pressure level in said storage reservoir.

4. The electro-pneumatic governor for a compressed air system as defined in claim 1, wherein said pressure switch and said solenoid valve are supported on a mounting plate which is secured to a manifold of the electro-pneumatic governor.

5. The electro-pneumatic governor for a compressed air system as defined in claim 4, wherein a sealed protective cover is attached to said mounting plate by a threaded stud.

6. The electro-pneumatic governor for a compressed air system as defined in claim 1, wherein said solenoid valve includes an electromagnetic coil and a pneumatic inlet, outlet and exhaust ports.

7. The electro-pneumatic governor for a compressed air system as defined in claim 4, wherein said pressure switch is pneumatically connected to said mounting plate by a threaded adapter.

8. The electro-pneumatic governor for a compressed air system as defined in claim 4, wherein said solenoid valve is pneumatically connected to said mounting plate by a threaded nipple.

9. The electro-pneumatic governor for a compressed air system as defined in claim 1, wherein said solenoid valve causes said pneumatically operated switch contact controller to be vented to atmosphere when the pressure level in said storage reservoir drops to the second predetermined value.

10. The electro-pneumatic governor for a compressed air system as defined in claim 6, wherein said pneumatic outlet port is connected to said pneumatic exhaust port when said solenoid valve is energized.

11. The electro-pneumatic governor for a compressed air system as defined in claim 6, wherein said pneumatic inlet port is connected to said outlet port when said solenoid valve is deenergized.

12. The electro-pneumatic governor for a compressed air system as defined in claim 2, wherein a varistor is connected in parallel with said electromagnetic coil to subdue voltage surges.

13. The electro-pneumatic governor for a compressed air system as defined in claim 4, wherein said mounting plate includes at least two ports having a given geometry for communicating with said pressure switch and said solenoid valve.

14. A fluid governor comprising motor means for driving a fluid compressor and causing a build-up of pressure in a storage reservoir comprising, switching means responsive to the pressure in said storage reservoir, electromagnetic valve means connected to said switching means, a pneumatically operated electrical contact means pneumatically connected to said electromagnetic valve means for causing said pneumatically operated electrical contact means to be connected to said storage reservoir when the pressure in said storage reservoir exceeds a first predetermined value to deenergize said motor means and for causing said pneumatically operated electrical contact means to be connected to atmosphere when the pressure in said storage reservoir drops to a second predetermined value to energize said motor means.

15. The fluid governor as defined in claim 14, wherein said switching means includes electrical contacts which are opened and closed by an expansion and contraction device.

16. The fluid governor as defined in claim 14, wherein said electromagnetic valve means includes a solenoid coil and a three-way pneumatic valve.

17. The fluid governor as defined by claim 16, wherein said solenoid coil is connected in parallel by a surge suppressing element.

18. The fluid governor as defined in claim 14, wherein said pneumatically operated electrical contact means includes a piston and cylinder for opening and closing a pair of electrical contact elements.

19. The fluid governor as defined in claim 18, wherein said pair of electrical contacts is opened to deenergize the motor means.

20. The fluid governor as defined in claim 14, wherein said switching means includes a pressure responsive bellows for opening and closing a pair of electrical contacts.

21. The fluid governor as defined in claim 14, wherein said switching means and said electromagnetic valve means are enclosed by a protective cover.

22. The fluid governor as defined in claim 14, wherein said switching means and said electromagnetic valve means are mounted on a base member having at least a pair of pneumatic ports having a fixed geometry for conveying fluid pressure to said switching means and said electromagnetic valve means.

* * * * *